(12) United States Patent
Matsuno et al.

(10) Patent No.: US 9,774,030 B2
(45) Date of Patent: Sep. 26, 2017

(54) NONAQUEOUS ELECTROLYTE SECONDARY BATTERY AND BATTERY PACK

(71) Applicant: KABUSHIKI KAISHA TOSHIBA, Minato-ku, Tokyo (JP)

(72) Inventors: Shinsuke Matsuno, Tokyo (JP); Takashi Kuboki, Tokyo (JP); Keiko Okamoto, Kanagawa (JP); Norikazu Osada, Tokyo (JP); Sara Yoshio, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 498 days.

(21) Appl. No.: 14/482,155

(22) Filed: Sep. 10, 2014

(65) Prior Publication Data

US 2015/0086852 A1  Mar. 26, 2015

(30) Foreign Application Priority Data

Sep. 24, 2013 (JP) .................................. 2013-197565

(51) Int. Cl.
*H01M 4/134* (2010.01)
*H01M 4/131* (2010.01)
(Continued)

(52) U.S. Cl.
CPC .......... *H01M 4/134* (2013.01); *H01M 4/131* (2013.01); *H01M 4/386* (2013.01); *H01M 4/387* (2013.01);
(Continued)

(58) Field of Classification Search
None
See application file for complete search history.

(56) References Cited

U.S. PATENT DOCUMENTS

2005/0244711 A1  11/2005  Fukui et al.
2007/0172733 A1  7/2007  Minami et al.
(Continued)

FOREIGN PATENT DOCUMENTS

CN  101425608 A  5/2009
CN  102326284 A  1/2012
(Continued)

OTHER PUBLICATIONS

Chinese First Office Action dated May 31, 2016 from corresponding Chinese Patent Application No. 2014104431069, 12 pages.

*Primary Examiner* — Tracy Dove
(74) *Attorney, Agent, or Firm* — Ohlandt, Greeley, Ruggiero & Perle, LLP

(57) ABSTRACT

A nonaqueous electrolyte secondary battery of an embodiment includes an exterior member; a positive electrode housed in the exterior member, a negative electrode containing an active material and housed in the exterior member so as to be spatially separated from the positive electrode via a separator, and a nonaqueous electrolyte filled in the exterior member. The negative electrode includes a negative electrode current collector and a negative electrode active material layer on the negative electrode current collector. A tensile strength of the negative electrode is 400 N/mm$^2$ or more and 1200 N/mm$^2$ or less. A peel strength between the negative electrode current collector and the negative electrode active material layer is 1.5 N/cm or more and 4 N/cm or less.

14 Claims, 4 Drawing Sheets

(51) Int. Cl.
*H01M 4/485* (2010.01)
*H01M 4/38* (2006.01)
*H01M 10/0525* (2010.01)
*H01M 4/02* (2006.01)

(52) U.S. Cl.
CPC ....... *H01M 4/485* (2013.01); *H01M 10/0525* (2013.01); *H01M 2004/021* (2013.01)

(56) References Cited

U.S. PATENT DOCUMENTS

| | | | |
|---|---|---|---|
| 2011/0183173 A1* | 7/2011 | Muraoka | H01M 4/13 |
| | | | 429/94 |
| 2012/0225351 A1* | 9/2012 | Kojima | H01M 4/0404 |
| | | | 429/211 |
| 2012/0258343 A1 | 10/2012 | Takahata et al. | |

FOREIGN PATENT DOCUMENTS

| | | | |
|---|---|---|---|
| CN | 102742065 A | 10/2012 | |
| CN | 103155247 A | 6/2013 | |
| JP | 2003-197191 A | 7/2003 | |
| JP | 2007-227328 A | 9/2007 | |
| JP | 2008-41511 A | 2/2008 | |
| JP | 2009-259502 A | 11/2009 | |
| JP | 2010-73618 A | 4/2010 | |
| JP | 2010-171366 A | 8/2010 | |
| JP | 2012-14895 A | 1/2012 | |
| JP | 2012-151129 A | 9/2012 | |
| WO | 2004/004031 A | 1/2004 | |

* cited by examiner

NONAQUEOUS ELECTROLYTE SECONDARY BATTERY AND BATTERY PACK

CROSS-REFERENCE TO RELATED APPLICATION

This application is based upon and claims the benefit of priority from Japanese Patent Application No. 2013-197565, filed on Sep. 24, 2013; the entire contents of which are incorporated herein by reference.

FIELD

Embodiments described herein relate to a nonaqueous electrolyte secondary battery and a battery pack.

BACKGROUND

Nonaqueous electrolyte batteries (mainly a lithium-ion secondary battery), whose negative electrode active material is a carbonaceous material and whose positive electrode active material is a sheet oxide containing nickel, cobalt, manganese etc., have already been in practical use as power sources in a wide range of fields from small things such as various electronic devices to large things such as electric vehicles. There is a strong demand from users for a smaller, lighter battery that can be used for a long period of time and has a longer life, and it has been strongly desired that the density of battery capacity be further improved and the ability of repeated use be improved. However, conventional carbonaceous materials are limited as to improving charge-discharge capacity. Furthermore, carbon baked at low temperatures, which is regarded as having a high capacity, has a low mass density and therefore its charge-discharge capacity per unit volume is difficult to increase. Therefore, for realizing a high-capacity battery, a new negative electrode material needs to be developed.

It has been proposed using, as a negative electrode material that can achieve a higher capacity than a carbonaceous material, a single-component metal such as aluminum (Al), silicon (Si), germanium (Ge), tin (Sn) or antimony (Sb). In particular, the use of Si as a negative electrode material can give a high capacity as high as 4200 mAh per unit weight (1 g). However, with the negative electrodes made from these single-component metals, the repeated uptake and release of Li causes elements to change to microparticles. Therefore, it is not possible to obtain a high charge-discharge cycle property.

For the purpose of solving these problems, amorphous tin oxide and silicon oxide etc. are able to achieve both an increase in capacity and a high cycle property. A further improvement can be achieved by using a carbon material in combination with the amorphous tin oxide or silicon oxide etc., as shown in Patent Literature 1. On the other hand, even with the use of the improved high-capacity tin oxide or silicon oxide, volume expansion during charging and shrinkage during discharging still impose a significant load on the battery. Specifically, for example, copper foil used as a current collector greatly deforms and an internal short-circuit is likely to occur when the battery is first charged, or the copper foil develops holes due to repeated use. This seriously compromises safety.

DETAILED DESCRIPTION

A nonaqueous electrolyte secondary battery of an embodiment includes an exterior member; a positive electrode housed in the exterior member, a negative electrode containing an active material and housed in the exterior member so as to be spatially separated from the positive electrode via a separator, and a nonaqueous electrolyte filled in the exterior member. The negative electrode includes a negative electrode current collector and a negative electrode active material layer on the negative electrode current collector. A tensile strength of the negative electrode is 400 N/mm$^2$ or more and 1200 N/mm$^2$ or less. A peel strength between the negative electrode current collector and the negative electrode active material layer is 1.5 N/cm or more and 4 N/cm or less.

A battery pack of an embodiment includes a nonaqueous electrolyte secondary battery includes an exterior member, a positive electrode housed in the exterior member, a negative electrode containing an active material and housed in the exterior member so as to be spatially separated from the positive electrode via a separator, and a nonaqueous electrolyte filled in the exterior member. The negative electrode includes a negative electrode current collector and a negative electrode active material layer on the negative electrode current collector. A tensile strength of the negative electrode is 400 N/mm$^2$ or more and 1200 N/mm$^2$ or less, and a peel strength between the negative electrode current collector and the negative electrode active material layer is 1.5 N/cm or more and 4 N/cm or less.

(First Embodiment)

The following description discusses a nonaqueous electrolyte secondary battery in accordance with a first embodiment.

The nonaqueous electrolyte secondary battery in accordance with the first embodiment includes: an exterior member; a positive electrode housed in the exterior member; a negative electrode that contains an active material and is housed in the exterior member so as to be spatially separated from the positive electrode via, for example, a separator; and a nonaqueous electrolyte filled in the exterior member.

Figure 1:
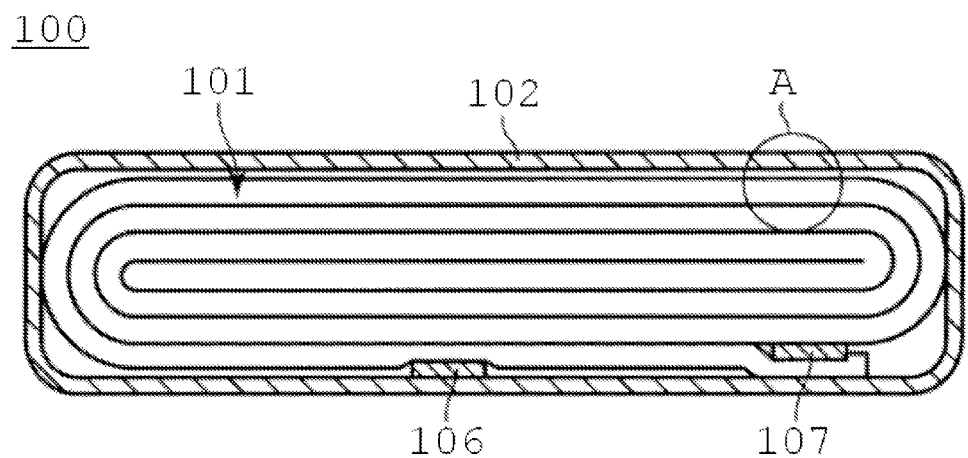
FIG. 1 schematically illustrates a flat nonaqueous electrolyte battery of an embodiment.
Figure 2:
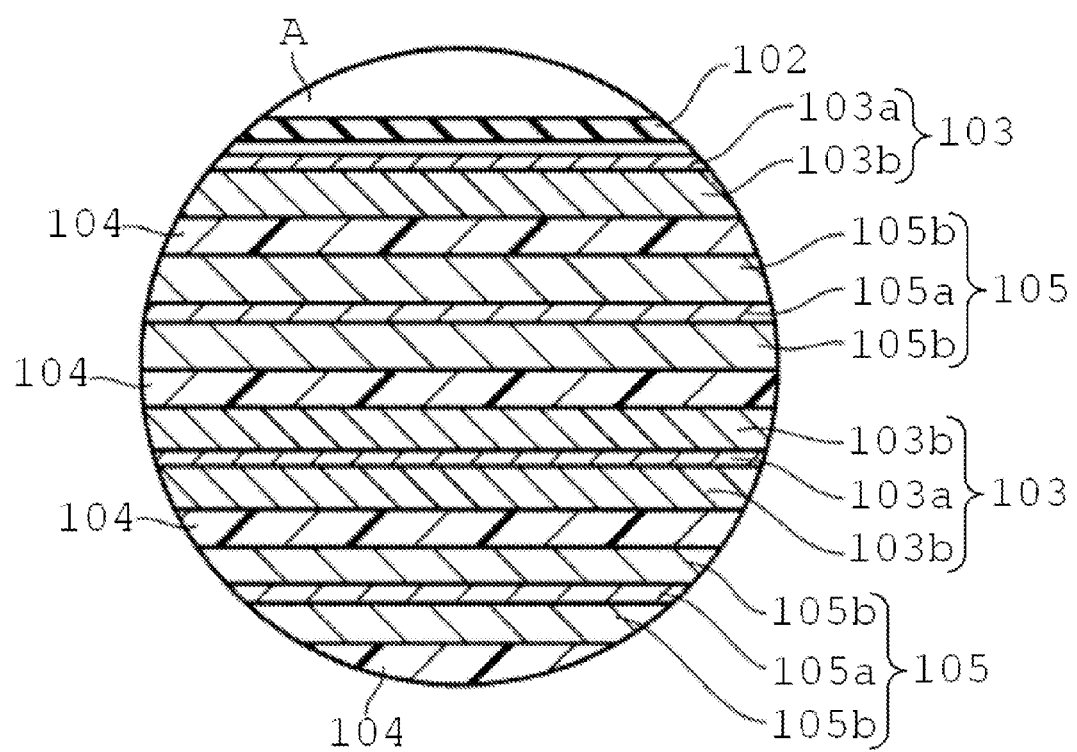
FIG. 2 is an enlarged schematic diagram of portion A of FIG. 1.

The following provides more detailed descriptions with reference to FIGS. 1 and 2 illustrating one example of a nonaqueous electrolyte secondary battery 100 in accordance with embodiments. FIG. 1 is a cross-sectional view schematically illustrating a flat nonaqueous electrolyte secondary battery 100 whose exterior member 102 is constituted by a laminated film, and FIG. 2 is an enlarged cross-sectional view of portion A of FIG. 1. It should be noted that these drawings are schematically illustrated for convenience of description, and therefore the shape, size and ratio etc. may be different from those of the actual battery. These designs can be changed as appropriate in consideration of the following descriptions and known techniques.

A flat rolled electrode group 101 is housed in the exterior member 102 constituted by a laminated film made up of two resin layers sandwiching aluminum foil between them. The flat rolled electrode group 101 is formed by rolling a stack of a negative electrode 103, a separator 104, a positive electrode 105 and a separator 104 stacked in this order from the outer side into a spiral shape and press-forming this roll. The outermost portion of the negative electrode 103 has, as illustrated in FIG. 2, a configuration in which a negative electrode active material layer 103b is provided on the inner surface of a negative electrode current collector 103a. The other portions of the negative electrode 103 are configured such that negative electrode active material layers 103b are provided on both surfaces of the negative electrode current collector 103a. An active material in the negative electrode active material layers 103b contains a battery active material in accordance with the first embodiment. The positive electrode 105 is configured such that positive electrode active material layers 105b are provided on both surfaces of a positive electrode current collector 105a.

In a portion near the circumference of the rolled electrode group 101, a negative terminal 106 is electrically connected to the negative electrode current collector 103a of the outermost portion of the negative electrode 103, and a positive terminal 107 is electrically connected to the positive electrode current collector 105a of the positive electrode 105 inside the flat rolled electrode group 101. The negative terminal 106 and the positive terminal 107 extend out through openings in the exterior member 102. Through the openings in the exterior member 102, a nonaqueous electrolyte in the form of, for example, liquid, is injected. The rolled electrode group 101 and the liquid nonaqueous electrolyte are hermetically enclosed by heat-sealing the openings of the exterior member 102 with the negative terminal 106 and the positive terminal 107 inserted in the openings.

Although the present embodiment discusses the rolled electrode group 101 as an electrode group, a stacked electrode group structured such that a positive electrode and a negative electrode are stacked alternately via a separator can be used. With a rolled electrode group, it is possible to enhance the effects of the present embodiment.

Examples of the negative terminal 106 include Al and aluminum alloys containing elements such as Mg, Ti, Zn, Mn, Fe, Cu and Si. The negative terminal 106 is preferably made from a material similar to that for the negative electrode current collector 103a, for a reduction of the contact resistance between the negative terminal 106 and the negative electrode current collector 103a.

The positive terminal 107 may be made from a material that is electrically stable and conductive when the electric potential for lithium ion metal is in the range of 3 V to 4.25 V. Specific examples of the material include Al and aluminum alloys containing elements such as Mg, Ti, Zn, Mn, Fe, Cu and Si. The positive terminal 107 is preferably made from a material similar to that for the positive electrode current collector 105a, for a reduction of the contact resistance between the positive terminal 107 and the positive electrode current collector 105a.

The following description discusses, in detail, the exterior member, the positive electrode, the negative electrode, the electrolyte and the separators, which are the constituents of the nonaqueous electrolyte secondary battery 100.

1) Exterior Member

The exterior member 102 is constituted by a laminated film having a thickness of 0.5 mm or less. Alternatively, the exterior member 102 is a metal container having a thickness of 1.0 mm or less. The metal container more preferably has a thickness of 0.5 mm or less.

The shape of the exterior member 102 can be selected from flat (thin), square, cylinder, coin, and button shapes. Examples of the exterior member 102 include exterior members for small batteries for use in mobile electronic devices etc. and exterior members for large batteries for use in two- to four-wheeled vehicles etc., depending on the size of the battery.

The laminated film is a multilayer film having resin layers and a metal layer sandwiched between the resin layers. The metal layer is preferably aluminum foil or aluminum alloy foil, for a reduction of weight. The resin layers can be made from a polymer material such as polypropylene (PP), polyethylene (PE), nylon, polyethylene terephthalate (PET). The laminated film can be formed into the shape of an exterior member by heat sealing.

The metal container is made from aluminum or an aluminum alloy or the like. The aluminum alloy is preferably an alloy containing an element such as magnesium, zinc, silicon etc. In the case where the alloy contains a transition metal such as iron, copper, nickel, chromium or the like, the amount of the transition metal is preferably 100 ppm by mass or less.

2) Positive Electrode 105

The positive electrode is structured such that the positive electrode active material layer (s) 105b containing an active material is/are supported on one surface or both surfaces of the positive electrode current collector 105a.

In terms of the large current discharge property and maintenance of cycle life of the battery, it is desirable that the thickness of the positive electrode active material layer 105b on one surface be 10 μm or more and 150 μm or less. Therefore, in the case where the positive electrode active material layers 105b are supported on both surfaces of the positive electrode current collector 105a, the total thickness of these positive electrode active material layers 105b is desirably 20 μm or more and 300 μm or less. A more preferred range of the thickness of the positive electrode active material layer 105b on one surface is 30 μm or more and 120 μm or less. The thickness within this range improves the large current discharge property and cycle life.

The positive electrode active material layer 105b may contain a conductive agent besides the positive electrode active material.

The positive electrode active material layer 105b may further contain a binding agent for binding the positive electrode material.

Preferred for use as the positive electrode active material are various oxides such as manganese dioxide, lithium-manganese complex oxides, lithium-containing cobalt oxides (e.g., $LiCoO_2$), lithium-containing nickel-cobalt oxides (e.g., $LiNi_{0.8}Co_{0.2}O_2$), lithium-manganese complex oxides (e.g., $LiNn_2O_4$, $LiMnO_2$), because the use of these oxides achieves high voltage.

Examples of the conductive agent include acetylene black, carbon black, and graphite.

Specific examples of the binding agent include polytetrafluoroethylene (PTFE), polyvinylidene fluoride (PVdF), ethylene-propylene-diene copolymer (EPDM), and styrene-butadiene rubber (SBR).

The positive electrode active material, the conductive agent and the binding agent are blended in amounts of preferably 80% by mass or more and 95% by mass or less, 3% by mass or more and 18% by mass or less, and 2% by mass or more and 7% by mass or less, respectively, because these percentages realize a good large current discharge property and good cycle life.

As the current collector, a porous or non-porous conductive substrate can be used. It is desirable that the thickness of the current collector be 5 μm or more and 20 μm or less.

This is because the thickness within this range achieves a balance between electrode strength and a reduction of weight.

The positive electrode 105 is produced by, for example, suspending an active material, a conductive agent and a binding agent in a general-purpose solvent to prepare slurry, applying the slurry to the current collector 105a, drying the slurry, and thereafter pressing the dried slurry. Alternatively, the positive electrode 105 may be produced by forming an active material, a conductive agent and a binding agent into pellets which serve as a positive electrode active material layer 105b and placing this positive electrode active material layer 105b on the current collector 105a.

3) Negative Electrode 103

The negative electrode 103 is structured such that the negative electrode active material layer (s) 103b containing a negative electrode material is/are supported on one surface or both surfaces of the negative electrode current collector 103a.

When the tensile strength and electrode peal strength of the negative electrode 103 are in a suitable relationship, the detachment of the negative electrode active material layer 103b can be reduced while the deformation of the negative electrode 103 during charging/discharging is reduced. Here, the negative electrode active material layer 103b means a layer that contains a negative electrode active material, a conductive agent, a binding agent, etc. Furthermore, a layer including the negative electrode active material layer (s) 103b and the negative electrode current collector 103a is defined as the negative electrode 103. The negative electrode 103 having a tensile strength of 400 N/mm$^2$ or more and 1200 N/mm$^2$ or less is preferable, because such a negative electrode 103 deforms to a reduced extent even if the rate of the volume change between before and after charging/discharging due to expansion of the negative electrode active material is large. It should be noted that the tensile strength is a value obtained by producing an electrode for a secondary battery and, before injecting a nonaqueous electrolyte, measuring the tensile strength in accordance with JIS Z 2241-2011. The tensile strength can be measured also after a nonaqueous electrolyte is injected and after charging/discharging is performed. In this case, the tensile strength can also be measured, after a nonaqueous electrolyte secondary battery is produced, using an electrode washed with methyl ethyl carbonate for 30 minutes and dried in a vacuum at room temperature for 24 hours. In the case where the tensile strength of the negative electrode 103 is less than 400 N/mm$^2$, the negative electrode 103 may not able to absorb the volume change due to expansion and is likely to deform. On the other hand, in the case where the tensile strength of the negative electrode 103 is more than 1200 N/mm$^2$, a surface of the negative electrode current collector 103a and a surface of the negative electrode active material layer 103b are likely to be detached from each other, although the deformation of the negative electrode 103 is prevented. For the same reasons as above, a more preferred range of the tensile strength of the negative electrode 103 is 400 N/mm$^2$ or more and 1000 N/mm$^2$ or less.

The tensile strength of the negative electrode 103 can be adjusted not only by adjusting the tensile strength of the negative electrode current collector 103a itself but also by adjusting the amount of a binding agent in the negative electrode active material layer 103b, press density of the negative electrode active material layer 103b, or conditions for a subsequent heat treatment. For example, the tensile strength is made less likely to decrease by reducing the press density and lowering the heat treatment temperature by approximately 25° C. to 50° C. Conversely, the tensile strength is made more likely to decrease, by increasing the press density and raising the heat treatment temperature. The tensile strength is also affected by the time during which a heat treatment is performed.

In order to prevent detachment while reducing the deformation of the negative electrode 103, it is preferable that, in addition to the tensile strength, the peel strength between the negative electrode active material layer 103b and the negative electrode current collector 103a, that is, the electrode peel strength, be 1.5 N/cm or more and 4 N/cm or less. In the case where the electrode peel strength is less than 1.5 N/cm, the volume change due to expansion of the negative electrode active material during charging is large and this is likely to cause detachment. On the other hand, in the case where the electrode peel strength is more than 4 N/cm, the negative electrode 103 itself is hard and is likely to become brittle and this is likely to cause a problem in battery production. A preferred range of the electrode peel strength is 2 N/cm or more and 3.5 N/cm or less.

The electrode peel strength in embodiments is cutting strength as determined by the SAICAS (Surface And Interfacial Cutting Analysis System) test. In this test, a surface of a sample is cut with a tiny, sharp blade while the depth of the cut position is being controlled and the stress applied on the blade is measured. The measured value obtained by cutting the interface between an electrode current collector and an electrode active material layer includes frictional resistance caused by the blade that makes contact with the surface of the current collector. The cutting strength, which is the electrode peel strength, is a value obtained by subtracting the frictional resistance from the measured value obtained by cutting the interface on the electrode active material layer. By fixing the depth position of the blade to the interface between the electrode current collector and the electrode active material layer, it is possible to measure the cutting strength of the interface. Here, the blade receives a certain necessary load in a direction of the electrode current collector. The certain necessary load is a force to cause the edge of the blade to continue to contact with the interface between the electrode current collector and the electrode active material layer. The cutting (peel) strength of the electrode active material layer against the electrode current collector is found.

The following description more specifically discusses how to find the electrode peel strength (cutting strength). The cutting strength was measured with the use of a cutting strength measuring apparatus SAICAS (registered trademark) Model DN-GS (manufactured by DAYPLA WINTES CO., LTD). The measurement was performed with the use of a cutting blade which was a ceramic blade made of borazon and having a width of 1.0 mm, at blade angles such as a rake angle of 20 degrees and a clearance angle of 10 degrees, at a constant speed of 2 μm/second. The temperature at which the measurement was performed was room temperature (25° C.), and the temperature of the sample was also room temperature (25° C.). The measurement was performed in a constant 0.5 N load mode.

The electrode peel strength of the negative electrode active material layer 103b can be adjusted, as with the tensile strength, by adjusting the amount of a binding agent in the negative electrode active material layer 103b, press density of the negative electrode active material layer 103b, and conditions for a subsequent heat treatment. Specifically, the electrode peel strength is made more likely to increase by increasing the amount of the binding agent, whereas the electrode peel strength is made more likely to decrease by reducing the amount of the binding agent. Furthermore, the electrode peel strength is made more likely to increase by increasing the press density, but, when the press density excesses a certain level, the electrode peel strength becomes likely to decrease. The best heat treatment temperature is 450° C. Temperatures below and above 450° C. tend to cause a reduction in electrode peel strength.

The ratio of the density of the negative electrode 103 charged in an environment of 25° C. at a C-rate of 0.2 C at 4.2 V to the density of the negative electrode 103 discharged in an environment of 25° C. at a C-rate of 0.2 C at 2.0 V, i.e., (density when charged)/(density when discharged), is preferably 0.25 or more and 0.9 or less. The density here means the density of the negative electrode active material layer 103b. The charging at a C-rate of 0.2 C here means charging that is performed in such a manner that: C-rate is calculated on the basis of the battery capacity (0.2 C rate) at initial charging (for example, assuming that the capacity is 3 Ah at a 0.2 C rate, C=3A); constant-current charging is performed at a C-rate of 0.2 C to 4.2 V; and thereafter charging is performed at a constant voltage until the electric current converges to 0.05 C. In the case where the density ratio is less than 0.25, the volume change due to expansion is too large and thus the deformation of the negative electrode 103 becomes difficult to reduce or the detachment of the negative electrode active material layer 103b becomes significant. On the other hand, in the case where the density ratio is more than 0.9, it is not necessary at all to employ a negative electrode current collector 103a that has a great strength. A more preferred range of the density ratio is 0.3 or more and 0.85 or less.

The mass per unit area of the negative electrode active material layer 103b is preferably 10 g/m² or more and 150 g/m² or less.

The mass per unit area of the negative electrode active material layer 103b here means, in the case where the negative electrode active material layers 103b are applied on both surfaces of the negative electrode current collector 103a, the mass per unit area of the negative electrode active material layer 103b on one of the surfaces. In the case where the mass per unit area of the negative electrode active material layer 103b is less than 10 g/m², it is not at all necessary to employ a current collector that has a great strength. On the other hand, in the case where the mass per unit area of the negative electrode active material layer 103b is more than 150 g/m², it is difficult to reduce the deformation of the negative electrode current collector 103a while keeping the binding property. A more preferred range of the mass per unit area of the negative electrode active material layer 103b is 20 g/m² or more and 100 g/m² or less.

The thickness of the negative electrode current collector 103a is preferably 5 μm or more and 25 μm or less.

In the case where the thickness of the negative electrode current collector 103a is less than 5 μm, for example, the negative electrode current collector 103a may be prone to breakage during battery production or the deformation of the negative electrode current collector 103a caused by charging/discharging may not be reduced. In the case where the thickness of the negative electrode current collector 103a is more than 25 μm, the volumetric capacity of the battery decreases. A preferred thickness of the negative electrode current collector 103a is 7 μm or more and 20 μm or less.

The negative electrode active material in the negative electrode active material layer 103b preferably contains at least one selected from silicon, silicon-containing oxides, tin, and tin-containing oxides.

The negative electrode active material in the negative electrode active material layer 103b is preferably at least one selected from silicon, silicon-containing oxides, tin, and tin-containing oxides. A silicon-containing oxide means $SiO_x$ ($0<x\leq2$), and may be in the form in which Si is deposited on the surface of $SiO_x$. A tin-containing oxide means $SnO_x$ ($0<x\leq2$), and may also be in the form in which Sn is deposited. Furthermore, for an improvement of the cycle property of the active material itself, the silicon-containing oxide and tin-containing oxide may have a minute amount of another substituent element. Furthermore, the silicon-containing oxide and tin-containing oxide may be covered with carbon.

The conductive agent for the negative electrode is, generally, a carbonaceous material. The carbonaceous material only needs to have a property of absorbing alkali metals well and be highly conductive. Examples of the carbonaceous material include acetylene black and carbon black. The carbonaceous material may be highly crystalline graphite.

Examples of the binding agent include polytetrafluoroethylene (PTFE), polyvinylidene fluoride (PVdF), fluororubber, ethylene-butadiene rubber (SBR), polypropylene (PP), polyethylene (PE), carboxymethyl cellulose (CMC), polyimide (PI), and polyacrylimide (PAI).

The percentages of the negative electrode active material, the conductive agent and the binding agent blended in the negative electrode active material layers 103b are preferably 70% by mass or more and 95% by mass or less, 0% by mass or more and 25% by mass or less, and 2% by mass or more and 10% by mass or less, respectively. It is preferable that the ratio of silicon atoms and tin atoms to carbon atoms in the finally resulting negative electrode active material layer be 5% or more and 80% or less.

4) Electrolyte

The electrolyte can be a nonaqueous electrolytic solution, a polymer electrolyte impregnated with an electrolyte, a polymer electrolyte or an inorganic solid electrolyte.

The nonaqueous electrolytic solution is a liquid electrolytic solution prepared by dissolving an electrolyte in a nonaqueous solvent, and is retained in the spaces in the electrode group.

The nonaqueous solvent is preferably a nonaqueous solvent containing mainly a mixed solvent obtained by mixing propylene carbonate (PC) or ethylene carbonate (EC) with another nonaqueous solvent (hereinafter referred to as a second solvent) that is less viscous than PC or EC.

The second solvent is preferably, for example, chain carbon. Preferred among others are, for example, dimethyl carbonate (DMC), methyl ethyl carbonate (MEC), diethyl carbonate (DEC), ethyl propionate, methyl propionate, γ-butyrolactone (EL), acetonitrile (AN), ethyl acetate (EA), toluene, xylene, and methyl acetate (MA) etc. These second solvents may be used individually or a mixture of two or more of them may be used. In particular, it is more preferable that the donor number of the second solvent be 16.5 or less.

The viscosity of the second solvent at 25° C. is preferably 2.8 cmp or less. The percentage by volume of ethylene carbonate or propylene carbonate in the mixed solvent is preferably 1.0% or more and 80% or less. A more preferred percentage by volume of ethylene carbonate or propylene carbonate is 20% or more and 75% or less.

Examples of the electrolyte contained in the nonaqueous electrolytic solution include lithium salts (electrolytes) such as lithium perchlorate ($LiClO_4$), lithium hexafluorophosphate ($LiPF_6$), lithium fluoroborate ($LiBF_4$), lithium hexafluoroarsenate ($LiAsF_6$), lithium trifluoromethanesulfonate (LiCF$_3$SO$_3$), and lithium bis(trifluoromethylsulfonyl) imide [LiN(CF$_3$SO$_2$)$_2$]. Of these, LiPF$_6$ and LiBF$_4$ are preferable.

The amount of the electrolyte dissolved in the nonaqueous solvent is desirably 0.5 mol/L or more and 2.0 mol/L or less.

5) Separator 104

In the case where a nonaqueous electrolytic solution is used, and in the case where a polymer electrolyte impregnated with an electrolyte is used, the separator 104 can be used. As the separator 104, a porous separator is used. The material for the separator 104 can be, for example, a porous film or synthetic resin nonwoven cloth containing polyethylene, polypropylene or polyvinylidene fluoride (PVdF), etc. Of these, a porous film made from polyethylene or polypropylene or a porous film made from both polyethylene and polypropylene is preferable because such a porous film improves the safety of the secondary battery.

The thickness of the separator 104 is preferably 30 μm or less. In the case where the thickness is more than 30 μm, the distance between the positive electrode and negative electrode becomes large and the internal resistance may become large. Furthermore, the lower limit of the thickness is preferably 5 μm. In the case where the thickness is less than 5 μm, the strength of the separator 104 significantly decreases and an internal short-circuit may become likely to occur. The upper limit of the thickness is more preferably 25 μm, and the lower limit is more preferably 1.0 μm.

The thermal shrinkage of the separator 104 when allowed to stand at 120° C. for 1 hour is preferably 20% or less. In the case where the thermal shrinkage is more than 20%, a short-circuit may become likely to occur when heated. The thermal shrinkage is more preferably 15% or less.

The porosity of the separator 104 is preferably 30% or more and 70% or less, for the following reason. In the case where the porosity is less than 30%, it may be difficult for the separator 104 to retain the electrolyte well. On the other hand, in the case where the porosity is more than 70%, it may be impossible to achieve a sufficient strength of the separator 104. A more preferred range of the porosity is 35% or more and 70% or less.

The air permeability of the separator 104 is preferably 500 seconds/100 cm$^3$ or less. In the case where the air permeability is more than 500 seconds/100 cm$^3$, it may be difficult to obtain a high lithium ion mobility in the separator 104. Furthermore, the lower limit of the air permeability is 30 seconds/100 cm$^3$. This is because, in the case where the air permeability is less than 30 seconds/100 cm$^3$, it may be impossible to achieve a sufficient strength of the separator 104.

The upper limit of the air permeability is more preferably 300 seconds/100 cm$^3$, and the lower limit is more preferably 50 seconds/100 cm$^3$.

(Second Embodiment)

The following description discusses a battery pack including the foregoing nonaqueous electrolyte secondary battery.

A battery pack in accordance with the second embodiment includes one or more nonaqueous electrolyte secondary batteries (i.e., single batteries) in accordance with the foregoing embodiment. The single batteries are used as cells of the battery pack. In the case where the battery pack includes a plurality of single batteries, these single batteries are electrically connected in series with each other, in parallel with each other, or in series and parallel with each other.

A battery pack 200 is specifically described with reference to a schematic diagram in FIG. 3 and a block diagram in FIG. 4. The battery pack 200 illustrated in FIG. 3 includes, as single batteries 201, nonaqueous electrolyte secondary batteries 100 each illustrated in FIG. 1.

The plurality of single batteries 201 are stacked together so that a negative terminal 202 and a positive terminal 203 extend out in the same direction, and the single batteries 201 are bundled with adhesive tape 204. In this way, the single batteries 201 constitute an assembled battery 205. These single batteries 201 are, as illustrated in FIG. 4, electrically connected in series with each other.

A printed circuit board 206 is positioned so as to face end faces of the single batteries 201 from which the negative terminal 202 and the positive terminal 203 extend out. The printed circuit board 206 has, as illustrated in FIG. 4, a thermistor 207, a protection circuit 208, and a conduction terminal 209 for external connection. It should be noted that a surface, of the printed circuit board 206, which faces the assembled battery 205 has an insulation plate (not illustrated) attached thereto to prevent unwanted contact with wires of the assembled battery 205.

A positive electrode-side lead 210 is connected to the positive terminal 203 at the lowermost layer of the assembled battery 205, and the other end of the positive electrode-side lead 210 is inserted in and electrically connected to a positive electrode-side connector 211 of the printed circuit board 206. A negative electrode-side lead 212 is connected to the negative terminal 202 at the uppermost layer of the assembled battery 205, and the other end of the negative electrode-side lead 212 is inserted in and electrically connected to a negative electrode-side connector 213 of the printed circuit board 206. These connectors 211 and 213 are connected to the protection circuit 208 via traces 214 and 215 on the printed circuit board 206.

The thermistor 207 is used to detect the temperature of the single battery 201, and its detection signal is transmitted to the protection circuit 208. The protection circuit 208 is able to disconnect a positive-side trace 216a and a negative-side trace 216b between the protection circuit 208 and the conduction terminal 209 for external connection, under a certain condition. The certain condition is a condition in which, for example, the temperature detected by the thermistor 207 is equal to or higher than a certain temperature. Alternatively, the certain condition is a condition in which overcharge, overdischarge, excess current or the like of the single batteries 201 is detected. The detection of overcharge or the like is performed with respect to each of the single batteries 201 or with respect to the entire single batteries 201. In the case where each of the single batteries 201 is subjected to detection, battery voltage may be detected or positive electrode potential or negative electrode potential maybe detected. In the latter case, a lithium electrode, which serves as a reference electrode, is inserted into each of the single batteries 201. In the case of FIGS. 3 and 4, wires 217 are connected to the respective single batteries 201 for voltage detection, and the detection signals are transmitted via the wires 217 to the protection circuit 208.

Three side faces of the assembled battery 205, other than the face from which the positive terminal 203 and the negative terminal 202 project, are provided with respective protection sheets 218 made from rubber or resin.

The assembled battery 205 is, together with the protection sheets 218 and the printed circuit board 206, housed in a case 219. That is, the protection sheets 218 are positioned on inside surfaces along the opposite long sides of the case 219 and on an inside surface along a short side of the case 219, respectively, and the printed circuit board 206 is positioned on an inside surface along the other short side of the case 219. The assembled battery 205 is positioned in a space enclosed by the protection sheets 218 and the printed circuit board 206. A lid 220 is attached to the top of the case 219.

It should be noted that the assembled battery 205 may be fixed with heat-shrinkable tape instead of the adhesive tape 204. In this case, a protection sheet is placed on opposite side faces of the assembled battery, heat-shrinkable tape is wound around, and then the heat-shrinkable tape is shrunk by heat to bundle the assembled battery.

Figure 3:
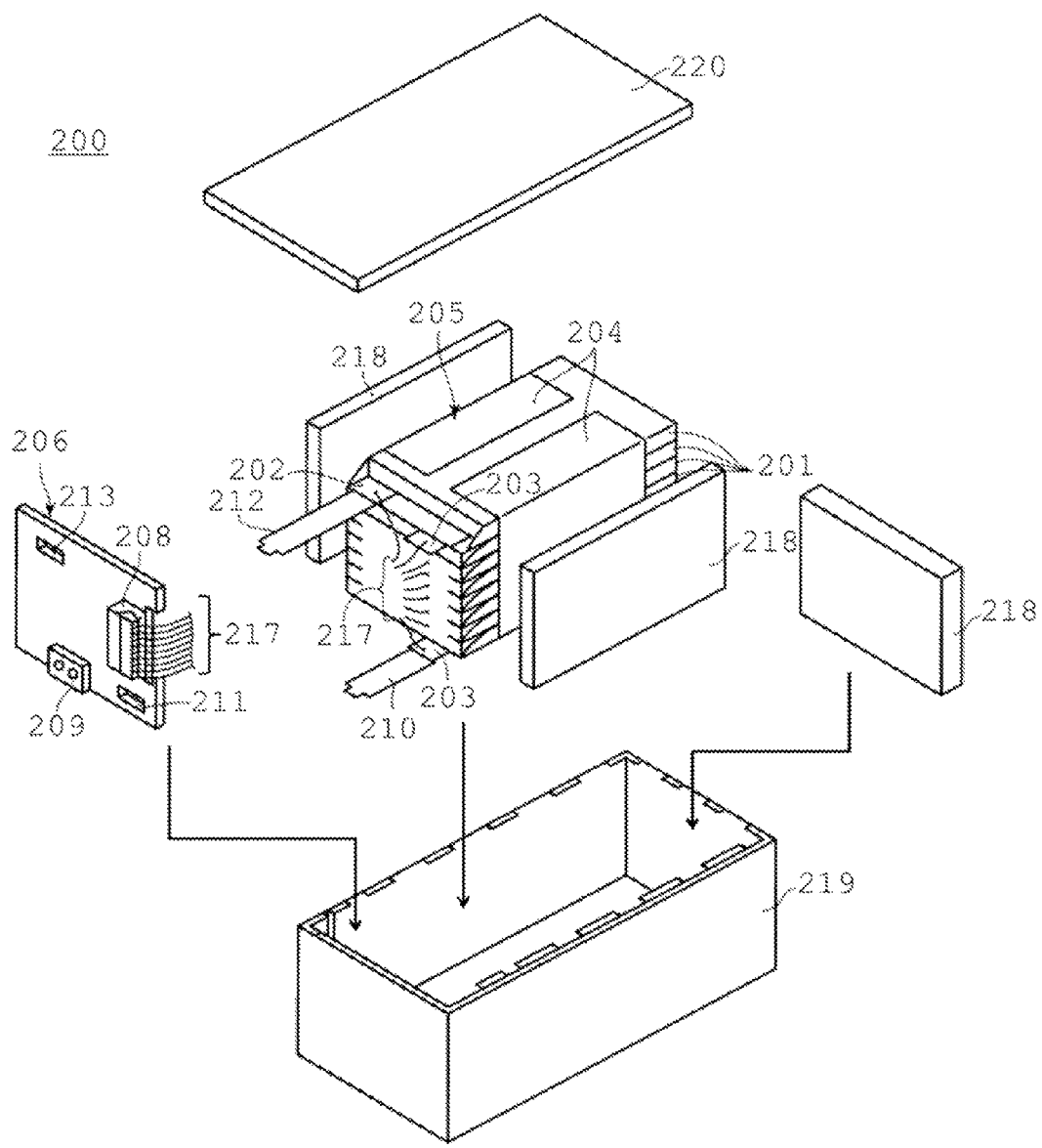
FIG. 3 schematically illustrates a battery pack of an embodiment.
Figure 4:
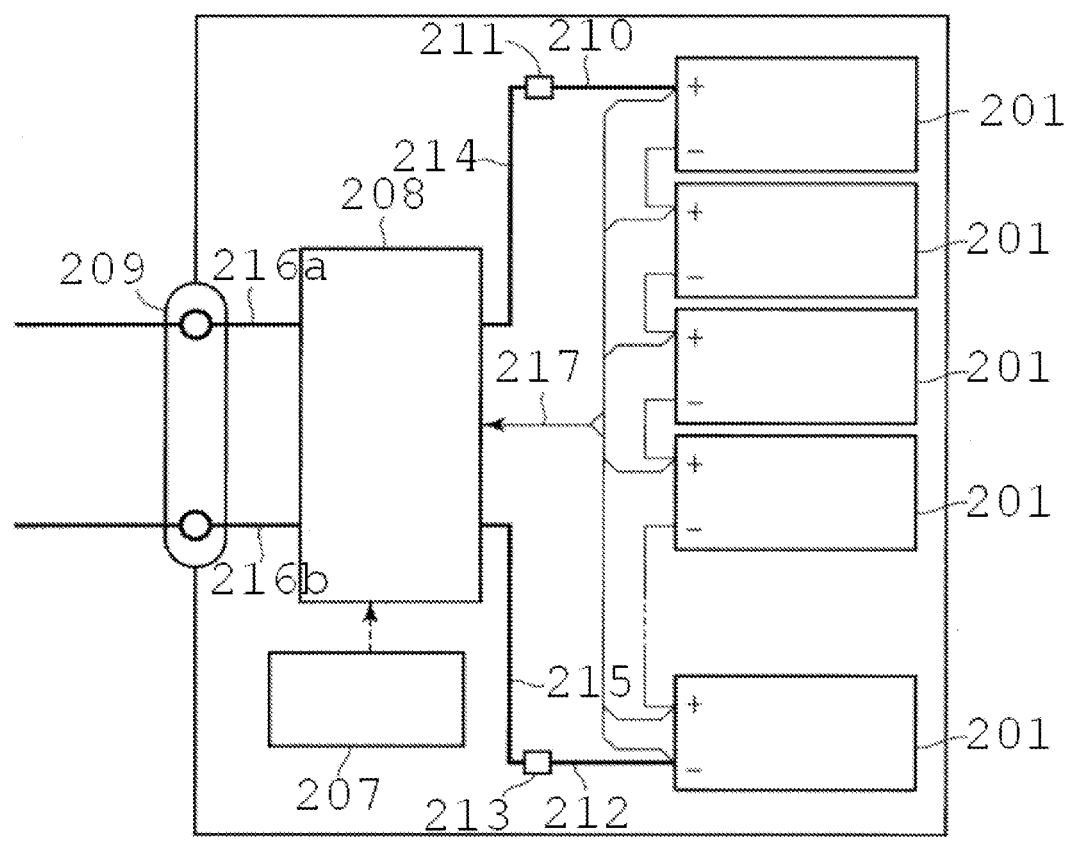
FIG. 4 is a block diagram illustrating an electric circuit of a battery pack of an embodiment.

Although FIGS. 3 and 4 illustrate a configuration in which the single batteries 201 are connected in series, the single batteries 201 may be connected in parallel for an increase in battery capacity. Alternatively, a mixture of series and parallel connections may be employed. The assembled battery packs may further be connected in series or parallel.

According to the present embodiment as described above, since the nonaqueous electrolyte secondary batteries of the foregoing embodiment which have an excellent charge-discharge cycle property are included, it is possible to provide a battery pack having an excellent charge-discharge cycle property.

It should be noted that the configuration of the battery pack may be changed appropriately according to purposes. The battery pack is preferably used also for something that requires a small, high-capacity battery. Specific examples include: power sources for smartphones and digital cameras; and automotive batteries for two- to four-wheeled hybrid electric vehicles, two- to four-wheeled electric vehicles, and electrically assisted bicycles.

The following description lists specific examples (in which a battery described with reference to FIG. 1 was actually produced in the condition described in each example) and discusses their effects. Note, however, that the embodiments are not limited to these examples.

EXAMPLE 1

<Production of Positive Electrode>

85% by mass of lithium/nickel/manganese/cobalt complex oxide powder ($LiNi_{1/3}Mn_{1/3}Co_{1/3}O_2$) (active material), 10% by mass of acetylene black, and 5% by mass of polyvinylidene fluoride (PVdF) were added to N-methyl-pyrrolidone, and mixed to prepare slurry. The slurry was applied to aluminum foil (current collector) having a thickness of 15 μm so that the mass per unit area of the resulting active material layer would be 270 g/m$^2$, was dried, and thereafter pressed. In this way, a positive electrode having a positive electrode active material layer with a density of 3.25 g/cm$^3$ was produced.

<Production of Negative Electrode>

80% by mass of a mixture of silicon oxide powder (SiO) and silicon powder (Si), 10% by mass of hard carbon powder, and 10% by mass of polyimide (PI) were added to NMP and mixed together to prepare slurry.

The slurry was applied to stainless-steel foil having a thickness of 10 μm so that the mass per unit area of the resulting active material layer would be 25 g/m$^2$, and was dried, and thereafter the negative electrode was extended by roll pressing so that the electrode density would be 1.5 g/cm$^3$. The produced electrode was subjected to a heat treatment at 450° C. for a day in an argon atmosphere having a dew point of −20° C.

<Production of Electrode Group>

The positive electrode, a separator constituted by a porous polyethylene film, the negative electrode, and the separator were stacked together in this order, and thereafter rolled into a spiral shape so that the negative electrode would be positioned outermost. In this way, an electrode group was produced.

<Preparation of Nonaqueous Electrolytic Solution>

Ethylene carbonate (EC) and methyl ethyl carbonate (MEC) were mixed together so that the volume ratio was 1:2, whereby a mixed solvent was produced. In this mixed solvent, 1.0 mol/L of lithium hexafluorophosphate ($LiPF_6$) was dissolved, whereby a nonaqueous electrolytic solution was prepared.

<Preparation of Nonaqueous Electrolyte Secondary Battery>

The electrode group and the nonaqueous electrolytic solution were each housed in a stainless-steel closed-end cylindrical container having a diameter of 1.8 mm and a height of 650 mm. Next, one end of a negative electrode lead was connected to the negative electrode of the electrode group. The other end of the negative electrode lead was connected to the closed-end cylindrical container which also serves as a negative terminal. Subsequently, a sealing insulator plate having a positive terminal attached to its center was prepared. One end of a positive electrode lead was connected to the positive terminal, and the other end was connected to the positive electrode of the electrode group, and thereafter the sealing insulator plate was crimped to the opening in the top of the case. In this way, a cylindrical nonaqueous electrolyte secondary battery was assembled.

The obtained secondary battery was charged at a C-rate of 0.2 C in an environment of 25° C. at 4.2 V, and thereafter discharged at a C-rate of 0.2 C until 2 V was reached. After that, the charging and discharging were performed once again in an environment of 25° C. at 4.2 V, and the capacity was checked.

<Measurement of Various Parameters>

Nonaqueous electrolyte secondary batteries produced in the same conditions as that of Example 1 were adjusted to 4.2 V and 2 V at a C-rate of 0.2 C, and were each disassembled in an argon atmosphere having a dew point of −50° C. The active material layer of each negative electrode was scraped out in an amount of several milligrams, dissolved in a hexane solvent, and measured for the density at 25° C. with the use of a pycnometer. After the density of each active material was calculated, the density ratio (density when 4.2 V)/(density when 2 V) was calculated. The density ratio was found to be 0.58. The negative electrode adjusted to 2 V was moved to a dry room environment having a dew point of −20° C., and the peel strength of the active material layer was measured with the use of SAICAS. As a result, the peel strength was found to be 2.8 N/cm. Lastly, the tensile strength of the electrode layer was measured with the use of a tensile/compression tester. The tensile strength was calculated from the load at which the electrode layer was broken. As a result, the tensile strength was found to be 865 N/mm$^2$. All the results are shown in Table 1.

EXAMPLES 2 TO 8, COMPARATIVE EXAMPLES 1 AND 2

The constituents and heat treatment temperature were changed appropriately so that the resulting negative electrodes would have the configurations as shown in Table 1. Furthermore, the amounts of application of the positive electrodes were adjusted according to the capacity per negative electrode active material and the amounts of application of the negative electrodes, so as to be approximately 150 g/m$^2$ to 300 g/m$^2$. Except for the above, nonaqueous electrolyte secondary batteries having the same configurations as that of Example 1 were produced.

TABLE 1A

| | Negative electrode active material | Tensile strength of electrode layer (N/mm$^2$) | Peel strength (N/cm) |
|---|---|---|---|
| Example 1 | Si, SiO | 865 | 2.8 |
| Example 2 | SiO | 400 | 1.5 |
| Example 3 | Si | 1200 | 4.0 |
| Example 4 | Si, Sn, SiO | 1000 | 3.2 |
| Example 5 | Si, SnO | 738 | 3.5 |
| Example 6 | Si, SiO, SnO | 638 | 2.0 |
| Example 7 | Si, SiO | 513 | 2.8 |
| Example 8 | Si, SiO | 400 | 1.5 |
| Comparative Example 1 | Si, SiO | 258 | 1.5 |
| Comparative Example 2 | Si, SiO | 651 | 0.8 |

TABLE 1B

| | Density ratio | Amount of application of negative electrode layer (g/m$^2$) | Thickness of current collector (μm) |
|---|---|---|---|
| Example 1 | 0.58 | 25 | 10 |
| Example 2 | 0.9 | 150 | 5 |
| Example 3 | 0.25 | 10 | 25 |
| Example 4 | 0.3 | 20 | 7 |
| Example 5 | 0.61 | 47 | 10 |
| Example 6 | 0.73 | 52 | 10 |
| Example 7 | 0.85 | 100 | 15 |
| Example 8 | 0.67 | 10 | 20 |
| Comparative Example 1 | 0.58 | 25 | 12 |
| Comparative Example 2 | 0.58 | 25 | 10 |

The batteries of Examples 1 to 8 and the batteries of Comparative Examples 1 and 2 were measured for capacities, and thereafter subjected to cycle testing 10 times at a C-rate of 1 C within the range of 4.2 V to 2.0 V, and thereafter the batteries were adjusted to 4.2 V. The batteries were then subsequently stored in an environment of 25° C. for a week, and their capacities were compared with the initial capacities.

TABLE 2

| | Capacity retention rate | Wrinkles, Holes | Holes etc. |
|---|---|---|---|
| Example 1 | 0.98 | No deformation was observed | Detachment was not observed |
| Example 2 | 0.92 | A small number of wrinkles only were observed, no holes were observed | Detachment was not observed |
| Example 3 | 0.97 | No deformation was observed | Detachment was not observed |
| Example 4 | 0.98 | No deformation was observed | Detachment was not observed |
| Example 5 | 0.96 | No deformation was observed | Detachment was not observed |
| Example 6 | 0.97 | No deformation was observed | Detachment was not observed |
| Example 7 | 0.95 | No deformation was observed | Detachment was not observed |
| Example 8 | 0.96 | A small number of wrinkles only were observed, no holes were observed | Detachment was not observed |
| Comparative Example 1 | 0.78 | Countless wrinkles and some holes were observed | Detachment was observed |
| Comparative Example 2 | 0.81 | No deformation was observed | Detachment was observed |

Detachment: Detachment of active material layer

The above results showed that, as compared to Examples 1 to 8, the nonaqueous electrolyte secondary batteries of Comparative Examples 1 and 2 had a small capacity retention rate, that is, the batteries self-discharged to a great extent. These batteries were disassembled, and their negative electrodes were observed. As a result, it was found that the negative electrode layer had large wrinkles, the detachment of the active material layer was noticeable, and the current collector had small holes. (Table 2)

As has been described, with the conditions of embodiments, it is possible to significantly reduce the deformation of the current collector due to volume expansion while keeping a high capacity.

In this specification, some elements are denoted by chemical symbols only.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte secondary battery, comprising:
an exterior member;
a positive electrode housed in the exterior member;
a negative electrode containing an active material and housed in the exterior member so as to be spatially separated from the positive electrode via a separator; and
a nonaqueous electrolyte filled in the exterior member,
wherein the negative electrode includes a negative electrode current collector and a negative electrode active material layer on the negative electrode current collector,
a tensile strength of the negative electrode is 400 N/mm$^2$ or more and 1200 N/mm$^2$ or less, and
a peel strength between the negative electrode current collector and the negative electrode active material layer is 1.5 N/cm or more and 4 N/cm or less,
wherein the negative electrode active material layer has at least one material selected from a group consisting of silicon, silicon-containing oxides, tin, and tin-containing oxides, and
wherein the current collector is stainless-steel foil.

2. The battery according to claim 1, wherein a ratio of a density of the negative electrode active material layer charged at 4.2 V to a density of the negative electrode active material layer discharged at 2.0 V is 0.25 or more and 0.9 or less.

3. The battery according to claim 1, wherein a mass per unit area of the negative electrode active material layer is 10 g/m$^2$ or more and 150 g/m$^2$ or less.

4. The battery according to claim 1, wherein a thickness of the negative electrode current collector is 5 μm or more and 25 μm or less.

5. The battery according to claim 1, wherein the tensile strength of the negative electrode is 400 N/mm$^2$ or more and 1000 N/mm$^2$ or less.

6. The battery according to claim 1, wherein the peel strength between the negative electrode current collector and the negative electrode active material layer is 2 N/cm or more and 3.5 N/cm or less.

7. The battery according to claim 1, wherein a mass per unit area of the negative electrode active material layer is 20 g/m$^2$ or more and 100 g/m$^2$ or less.

8. A battery pack comprising a nonaqueous electrolyte secondary battery which includes:
   an exterior member;
   a positive electrode housed in the exterior member;
   a negative electrode that contains an active material and is housed in the exterior member so as to be spatially separated from the positive electrode via a separator; and
   a nonaqueous electrolyte filled in the exterior member,
   wherein the negative electrode includes a negative electrode current collector and a negative electrode active material layer on the negative electrode current collector,
   a tensile strength of the negative electrode is 400 N/mm$^2$ or more and 1200 N/mm$^2$ or less, and
   a peel strength between the negative electrode current collector and the negative electrode active material layer is 1.5 N/cm or more and 4 N/cm or less,
   wherein the negative electrode active material layer has at least one selected from a group consisting of silicon, silicon-containing oxides, tin, and tin-containing oxides, and
   wherein the current collector is stainless-steel foil.

9. The battery pack according to claim 8, wherein a ratio of a density of the negative electrode active material layer charged at 4.2 V to a density of the negative electrode active material layer discharged at 2.0 V is 0.25 or more and 0.9 or less.

10. The battery pack according to claim 8, wherein a mass per unit area of the negative electrode active material layer is 10 g/m$^2$ or more and 150 g/m$^2$ or less.

11. The battery pack according to claim 8, wherein a thickness of the negative electrode current collector is 5 μm or more and 25 μm or less.

12. The battery pack according to claim 8, wherein the tensile strength of the negative electrode is 400 N/mm$^2$ or more and 1000 N/mm$^2$ or less.

13. The battery pack according to claim 8, wherein the peel strength between the negative electrode current collector and the negative electrode active material layer is 2 N/cm or more and 3.5 N/cm or less.

14. The battery pack according to claim 8, wherein a mass per unit area of the negative electrode active material layer is 20 g/m$^2$ or more and 100 g/m$^2$ or less.

* * * * *